(No Model.)
W. PAGE.
TWO WHEELED VEHICLE.
No. 414,439. Patented Nov. 5, 1889.
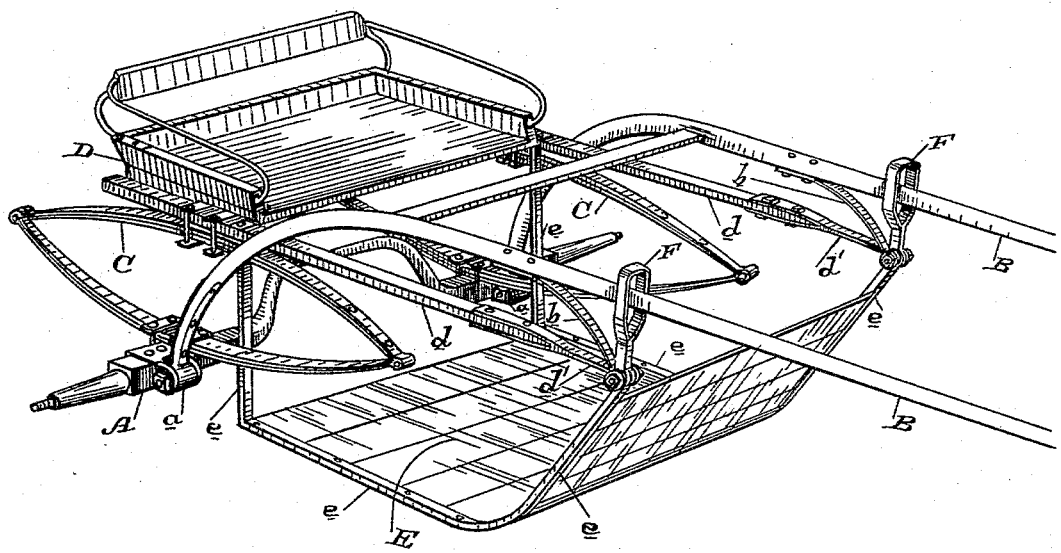
Witnesses,
Geo. H. Strong
B. Krause
Inventor,
Wilfred Page
By Dewey & Co,
Attys

UNITED STATES PATENT OFFICE.

WILFRED PAGE, OF PENN'S GROVE, CALIFORNIA.

TWO-WHEELED VEHICLE.

SPECIFICATION forming part of Letters Patent No. 414,439, dated November 5, 1889.

Application filed June 14, 1889. Serial No. 314,298. (No model.)

*To all whom it may concern:*

Be it known that I, WILFRED PAGE, of Penn's Grove, Sonoma county, State of California, have invented an Improvement in Two-Wheeled Vehicles; and I hereby declare the following to be a full, clear, and exact description of the same.

My invention relates to the class of two-wheeled vehicles commonly known as "carts;" and my invention consists in the hereinafter-described novel connection and arrangement of parts, the object of which is to provide a cart in which the "horse motion" is obviated, so that the vehicle becomes an easy-riding practical conveyance.

Referring to the accompanying drawing, the figure is a perspective view of my vehicle, the wheels being omitted.

A is the axle, B are the shafts, C are the body-springs, and D is the body, of which E is the foot portion or board. The shafts are connected with the axle either rigidly or, as here shown, by the ordinary pivoted thill-couplings $a$ of a four-wheeled vehicle. The body-springs are clipped solidly to the axle, and the body is clipped solidly to the springs through the intervention of the body-bars $d$. The forward ends of the body-bars $d$ are connected with the shafts through the flat springs $b$, which are bolted at their rear ends under the shafts, and have their forward ends connected with the irons $d'$, extending forwardly from the body-bars. A yielding connection between the shafts and body is thus provided, which avoids the transmission of the up-and-down movement of the former to the latter; but in order to properly limit the play of this connection I have the limiting-loops F attached to the body bars and springs $b$ at their junction, and loosely or freely embracing the shafts. To the bases of these loops, or the forward ends of the body-bars, I connect the foot-board straps $e$, which at their rear ends are clipped to the body-bars, and thence pass down in front of the axle, thence horizontally, and finally up to their forward connection. This provides a simple and effective connection of all the parts and gives a vehicle which proves an easy-riding and practical conveyance.

Having thus described my invention, what I claim as new, and desire to secure by Letters Patent, is—

1. In a two-wheeled vehicle, the axle, the shafts connected therewith, the body-springs, and the body, in combination with the body-bars clipped to the springs and extending forwardly, the irons $d'$, projecting from said bars and connecting them with the foot portion of the body, and the springs $b$, connected to the front of the irons and to the shafts, substantially as described.

2. In a two-wheeled vehicle, the body, with its foot portion E, the axle, the body-springs, and the shafts, in combination with the body-bars having the irons $d'$ on the front ends connecting them with the front of the foot portion of the body, the flat springs $b$ between the front of the body-bars and the shafts, and the limiting-loops F, extending from the front corners of the foot portion of the body and embracing the shafts, substantially as described.

3. In a two-wheeled vehicle, the combination of the axle, the shafts connected therewith, the body-springs, the body having a foot-board, the body-bars, the loops F, connected with the body-bars and loosely embracing the shafts, and the straps $e$ of the foot-board bolted at their rear ends to the shafts and connected at their forward ends with the body-bars and loops F, substantially as described.

4. In a two-wheeled vehicle, the combination of the axle, the shafts connected therewith, the body-springs, the body having a foot-board, the body-bars, the springs $b$, connecting the shafts with the body-bars, the loops F, connected with the body-bars and loosely embracing the shafts, and the straps $e$ of the body foot-board, bolted at their rear ends to the shafts and connected at their forward ends with the body-bars and loops F, substantially as described.

In witness whereof I have hereunto set my hand.

WILFRED PAGE.

Witnesses:
A. B. HILL,
J. C. SCOTT.